United States Patent [19]

Simms et al.

[11] Patent Number: 4,839,903
[45] Date of Patent: Jun. 13, 1989

[54] RING LASER GYROSCOPES

[75] Inventors: Graham J. Simms; David J. Guppy, both of Bracknell, England

[73] Assignee: British Aerospace Public Limited Company, London, England

[21] Appl. No.: 878,592

[22] Filed: Jun. 26, 1986

[30] Foreign Application Priority Data

Jun. 27, 1985 [GB] United Kingdom ............ 8516286

[51] Int. Cl.⁴ .............................................. H01S 3/083
[52] U.S. Cl. ..................................... 372/94; 372/87; 356/350
[58] Field of Search ........................... 372/94, 81, 87; 356/350

[56] References Cited

U.S. PATENT DOCUMENTS

| | | | |
|---|---|---|---|
| 4,392,229 | 7/1983 | Hostetler | 372/94 |
| 4,407,583 | 10/1983 | Simms | 372/94 |
| 4,481,635 | 11/1984 | Broberg et al. | 356/350 |
| 4,667,162 | 5/1987 | Broberg et al. | 372/94 |

FOREIGN PATENT DOCUMENTS 0040004 11/1981 European Pat. Off. .
2548777 1/1985 France .
2137013 9/1984 United Kingdom .

Primary Examiner—William L. Sikes
Assistant Examiner—B. R. R. Holloway
Attorney, Agent, or Firm—Cushman, Darby & Cushman

[57] ABSTRACT

Triaxial ring laser gyroscopes have three interconnecting cavities which provide many paths along which discharge can be initiated, and consequently it has been found that it is difficult to achieve the correct discharge. It is therefore proposed to align the desired discharge paths with the electrostatic fields which exist due to the voltage differences between the cathode and each one of the six anodes to enhance the initiation of the correct discharge.

7 Claims, 3 Drawing Sheets

RING LASER GYROSCOPES

BACKGROUND OF THE INVENTION

1. Field of the Invention

This invention relates to ring laser gyroscopes having a plurality of sensitive axes.

2. Description of the Prior Art

Such ring laser gyroscopes have, for each axis, a gas-filled cavity or ring disposed in a plane at right angles to the associated axis, each cavity comprising three or more linear, and usually equal length limbs. Around each cavity are propagated two beams of light travelling in opposite directions, which beams are directed in continously rotating paths by mirrors located at the respective cavity corners. The beams of light are produced by laser means, the initial start-up and subsequent operation of which is by discharge between cathode and anode means associated with each cavity.

A particular form of ring laser gyroscope, to which the present invention specifically relates, comprises three four-corner cavities arranged in mutually orthogonal planes, each corner of one cavity coinciding with one corner of another cavity, so that the cavities are interconnected, and six mirrors disposed respectively at the coinciding cavity corners, the mirrors and the cavities being orientated such that the normal to each of the mirrors lies in the plane of each cavity it serves and bisects the associated corners of those cavities.

With this arrangement, a single block of material can be used to house all three cavities. It is also possible to share common cathode means with all three cavities thus reducing the number of electrodes required.

Irrespectively, since the cavities are interconnected, there are many paths along which discharge can take place and difficulties are found in reliably initiating the correct discharge paths.

SUMMARY OF THE INVENTION

It is thus an object of the present invention to provide an arrangement in which the desired discharge is at least more reliably achieved.

According to one aspect of the invention, there is provided a ring laser gyroscope for sensing motion in three mutually orthognal axes, the gyroscope comprising:

three lasing cavities, each arranged to sense motion in one of said axes, each cavity being in the shape of a geometric figure and having a mirror positioned at each corner of the figure, at least one of the corners belonging to one cavity connecting with a corner belonging to another cavity so that a mirror is shared between more than one cavity;

a cathode connected to each lasing cavity by a cathode duct; and for each cavity, first and second anodes connected to the cavity by first and second anode ducts;

whereby, for each cavity, the anodes are positioned relative to the cathode so that the initial discharge paths between the first anode and cathode and the second anode and cathode are substantially aligned with respective electrostatic fields produced across the respective anode-cathode pairing.

According to a second aspect of the present invention, there is provided a ring laser gyroscope having three four-cornered cavities arranged in mutually orthogonal planes, each corner of one cavity coinciding with one corner of another cavity, so that the cavities are interconnected, and six mirrors disposed respectively at the coinciding cavity corners, the mirrors and the cavities being orientated such that the normal to each of the mirrors lies in the plane of each cavity it serves and bisects the associated corners of those cavities, includes a cathode positioned to be equally accessible to each of said cavities, and a plurality of anodes, two being accessible to each cavity, each anode being spaced from said cathode and from one another to initiate discharge and thereby provide the two counter-rotating beams for each cavity, there being, at least initially, an electrostatic field associated with the cathode and each anode, the discharge paths between the cathode and each anode for each cavity being arranged so as to generally follow the field lines of said electrostatic fields whereby the regular attainment of correct discharge paths is at least enhanced.

According to a third aspect of the invention, there is provided a ring laser gyroscope having three lasing cavities formed within a cube and positioned with respect to one another to be sensitive in three orthogonal axes, each cavity having four limbs of equal length to form a square and having a mirror positioned at each corner, the mirrors each being placed on a face of the cube and each being shared by two cavities, is characterised by including a single cathode positioned along an axis extending through two diametrically opposed corners of the cube, three equal length straight cathode ducts, providing discharge communication between the cathode and the cavities, six anodes and six equal length straight anode ducts, providing discharge communication between the anodes and the cavities, the arrangement being such that each cavity has two cathode ducts leading from the cathode to two adjacent corners of the cavity, two anodes, two anode ducts one for each anode, and has provided two junction points, one in each of those parallel limbs extending from said adjacent corners, by means of which a respective anode duct connects with the cavity, each cavity thus having two discharge paths of identical length, each path comprising three components, a cathode duct, an anode duct, and a length of cavity limb extending between one of said adjacent corners and a junction point, the position of the cathode and the two anodes in relation to one another and to each cavity being such that when an electrostatic field exists between the cathode and each anode, the axes of the three components of each discharge path generally follow the field lines of its associated electrostatic field whereby the attainment of correct discharge paths is facilitated.

According to a fourth aspect of the invention, there is provided a multiple-axis ring laser gyroscope comprising a plurality of closed polygonal paths defining optical cavities formed in a block of dielectric material, gas within said cavities for supporting an electric discharge and for then simulating laser beams to pass around said cavities, a cathode coupled to said block and cummunicating with said cavities by way of respective ducts within the block and, for each cavity, at least one anode which communicates with the cavity at a point spaced from that at which the cathode communicates with the same cavity, by way of a respective duct within the block, the positions of said cathode and said anodes and the directions of said ducts relative to said cavities being such that every angle in the discharge path between the cathode and any anode is at least 90° or greater and, at the instant of application of an electric potential between said cathode and said one anode, the rate of change in electric potential along said path is always of the same polarity and not zero.

BRIEF DESCRIPTION OF THE DRAWINGS

A three-axis ring laser gyroscope is described by way of example with reference to the accompanying drawings, in which.

DETAILED DESCRIPTION OF THE PREFERRED EMBODIMENT

Figure 1:
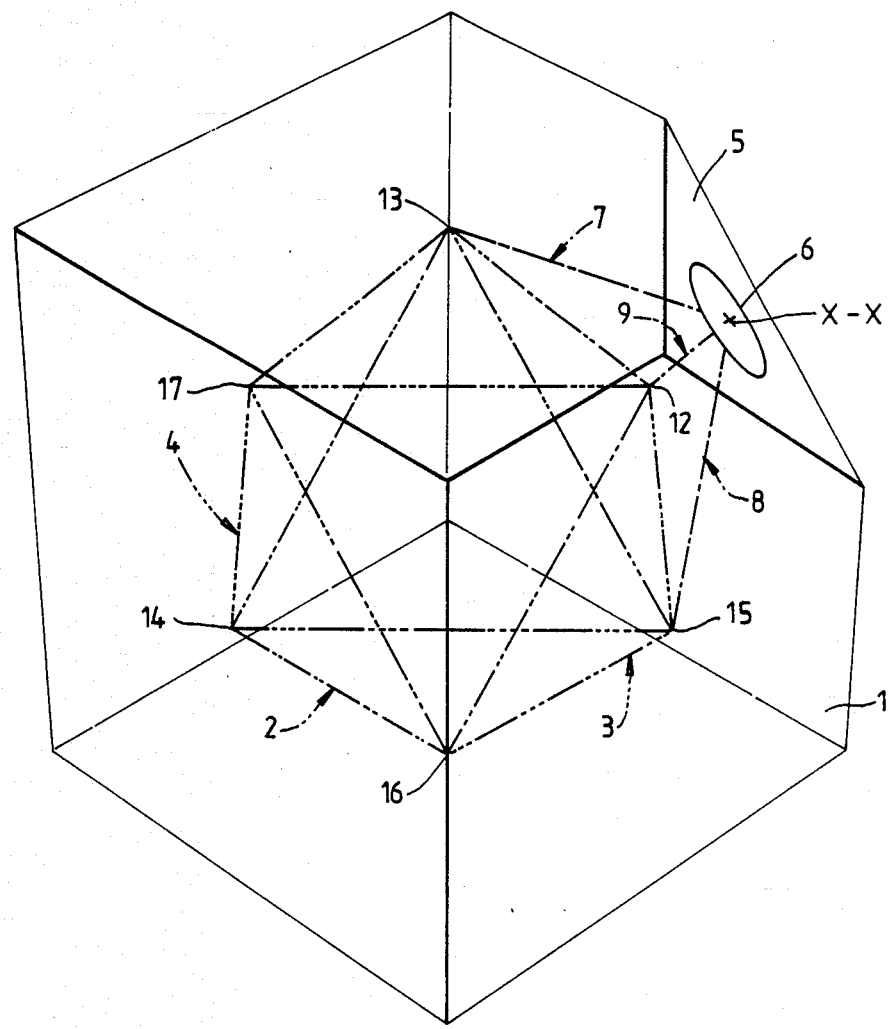
FIG. 1 is a diagrammatic view of the gyroscope.

FIG. 1 shows a block of dielectric material in the shape of a cube 1 in which are formed three lasing cavities 2, 3 and 4. The material from which the cube 1 is made has a low coefficient of expansion and may be made of Zerodur, a glass ceramic. The cavities 2, 3 and 4 are formed by drilling holes from the center of each face of the cube 1 to the centre of each adjacent face. The cavities so formed are interconnected at the corners. Each cavity is in the form of a square, and lies in a plane perpendicular to its sensitive axis. One corner 5 of the cube 1 is removed to provide a surface on which a single cathode 6 is mounted.

Figure 2:
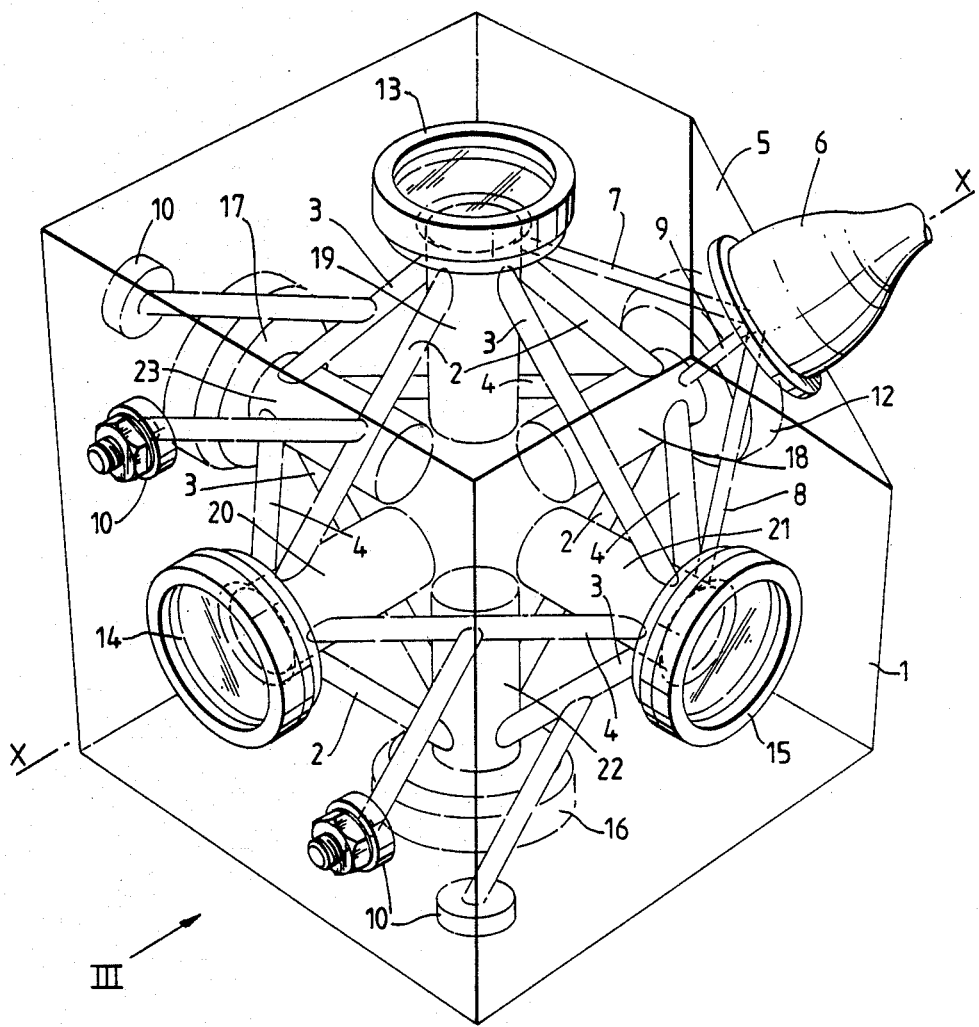
FIG. 2 is a perspective view of the FIG. 1 gyroscope in which the block is assumed to be transparent.

Referring now also to FIG. 2, the cathodoe 6 lies upon an axis X—X which extends between two diametrically opposed corners of the cube. The cavities are connected with the cathode by three straight cathode ducts 7, 8 and 9 of equal length, duct 7 connecting with cavities 2 and 3, duct 8 with cavities 3 and 4, and duct 9 with cavities 2 and 4. Six anodes 10, of which only four are shown for clarity are provided on faces of the cube remote from the corner 5, (two for each cavity) spaced apart from one another and from the cathode 5. Each anode is connected to its associated cavity by a straight anode duct 11, which enters the cube 1 normal to its associated face.

Six mirrors 12, 13, 14, 15. 16 and 17 are provided which are positioned one at the centre of each face of the cube and therefore at the corners of the cavities 2, 3 and 4. Each mirror is then used for two cavities. A reservoir of lasing medium is provided at each corner and through which the cavities pass, the reservoirs being referenced 18 to 23 respectively. These reservoirs extend normally into the cube from their asociated mirrors.

Figure 3:
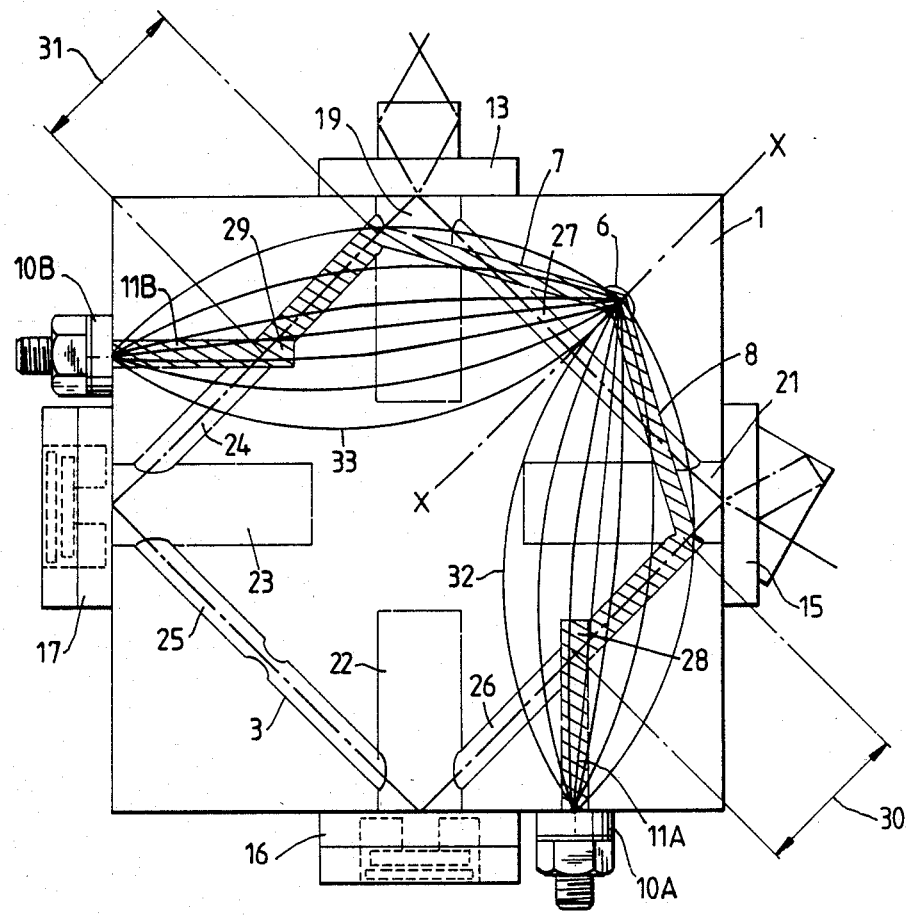
FIG. 3 is a plan view on Arrow III of FIG. 2.

For clarity, FIG. 3 shows only cavity 3 and it will be appreciated that the other two cavities are identical. This cavity has four limbs 24, 25, 26, and 27, which are interconnected by mirrors 13, 15, 16 and 17 mounted at the corners of the cavity as shown. The cathode 6 is connected with the cavity 3 via two cathode ducts 7 and 8, which extend from the cathode 6 to adjacent corners of the cavity, entering reservoirs 19 and 21 at an angle determined by the amount the corner 5 is cut away from the cube 1. The duct 7 feeds both cavity 3 and cavity 4, whilst the duct 8 feeds both cavity 3 and cavity 2 (not shown in FIG. 3).

As before mentioned, although each cavity shares the single cathode 6 each has two asociated anodes, the anodes assocoiated with cavity 3 being referenced 10A and 10B, respectively and provide the standing wave in the cavity having the desired clockwise and counterclockwise components.

Anode 10A is connected to the cavity 3 by means of an anode duct 11A while anode 10B is connected to the cavity 3 by means of an anode duct 11B. The ducts 11A and 11B break into the limbs 26 and 24 at points 28 and 29, respectively, and are identically spaced from the the mirrors 13 and 15 by lengths 30 and 31, that is to say, from the entry points of the cathode ducts 7 and 8. Accordingly the cavity 3, and also the other cavities, has two discharge paths—for cavity 3 these are referenced from the cathode 6 to the anode 10B as 7-31-11B and from the cathode 6 to the anode 7A, as 8-30-11A.

At the moment a potential is applied to cathode 6 and to the anodes 10A, 10B to start the discharge, there exist electrostatic fields between the cathode and the anodes. These are schematically shown with reference to cavity 3, in FIG. 3, the field lines being shown generally at 32 for anode 10A and 33 for anode 10B. Naturally, these field lines pass through the material of the cube 1 which is a dielectric, and through the cavities formed in the cube. Naturally, each cavity has its own associated field lines but these lines interact with lines from each of the other cavities to form a complex pattern of electrostatic field lines which extend throughout the entire cube. Consequently, those lines shown in FIG. 3 are of an idealised field line system.

It is normal practice to fill the cavities with a helium and neon gas mixture and although random ionisation of this gas is continously occurring naturally before the potential is applied, when the field exists, the ions and electrons within the gas are attracted in the direction of the field lines towards the cathode 6 and the anodes 10A and 10B respectively. This gives rise to a net current flow which results in the initiation of discharge. It is found that the ease with which this discharge is initiated is enhanced if the paths to be followed by the discharge follow generally the electrostatic field lines. Thus the axes of the components of the discharge paths 7-31-11B and 8-30-11A are arranged to generally follow the electrostatic field lines 33 and 32 respectively. This is achieved by forming the cutaway 5, i.e. the face on which the cathode 6 is located, sufficiently away from the centre of the cube, allowing for a suitable area for mounting, so that the axes of the cathode ducts 7, 8 and 9 slope generally downwards (assuming the cube to be positioned for descriptive purposes that the cathode 6 lies at the top) towards the adjacent corners of the cavities 2, 3, and 4, and as mentioned previously, duct 7 connects with cavities 2 and 3, duct 8 with cavities 3 and 4, and duct 9 with cavities 2 and 4. It is further achieved by selecting those lengths of the cavity limbs to be part of the discharge path (namely, those referenced 30 and 31 in cavity 3) such that their axes are also as near as possible aligned with their respective field lines, and, finally, by positioning the anodes 10 (namely those referenced 10A and 10B in cavity 3) on their respective faces of the cube such that the axes of their associated anode ducts (namely those referenced 11A and 11B in cavitiy 3) can be formed to cut into those selected points of the cavity limbs (namely 28, 29 on cavity 3) which allow the duct axes to also follow the field lines. In addition to enhancing the likelihood of correct discharge initiation, this arrangement also allows the cathode 6 and all the anodes 10 to be mounted on external surfaces of the cube.

We claim:

1. A ring laser gyroscope for sensing motion is a plurality of mutually orthogonal axes, the gyroscope comprising:

a plurality of lasing cavities defined in a mass of dielectric material, each cavity arranged to sense motion in one of said axes, each cavity being in the shape of a polygon and having a mirror positioned at each corner of the polygon, at least one of the corners belonging to one cavity connecting with a corner belonging to another cavity so that a mirror is shared between more than one cavity;

an electrode duct defined for each lasing cavity in said dielectric material;

a first electrode of one polarity connected to each lasing cavity by said electrode duct; and at least one second electrode, having a polarity opposite from that of the first electrode, connected to each respective cavity;

wherein, for each cavity, the at least one second electrode is positioned relative to the respective first electrode and electrode duct so that an initial discharge path between each first electrode and second electrode in each cavity substantially follows respective electrostatic field lines that are produced across the respective first and second electrodes in each cavity, wherein said initial discharge path comprises a plurality of parts and each part of said initial discharge path subtends an obtuse angle to at least one adjacent part of said initial discharge path, whereby initiation of a desired initial discharge path is facilitated.

2. A gyroscope according to claim 1 wherein said first electrode is a cathode and said at least one second electrode is an anode.

3. A ring laser gyroscope comprising:

three four-cornered cavities defined in a mass of dielectric material and arranged in mutually orthogonal planes, each corner of one of said cavities coinciding with one corner of another of said cavities, so that said cavities are interconnected;

six mirrors disposed respectively at the coinciding cavity corners, said six mirrors and said cavities being orientated such that the normal to each of the mirrors lies in the plane of each cavity it serves and bisects the associated corners of those cavities;

a cathode positioned so as to be equally accessible to each of said cavities; and a plurality of anodes, two of said anodes being accessible to each cavity, each anode being spaced from said cathode and from the other anodes to initiate discharge and thereby provide two counter-rotating beams for each cavity, whereby an electrosotatic field may be induced between the cathode and each anode so that any discharge paths between the cathode and each anode for each cavity are arranged to generally follow the field lines of said electrostatic fields, whereby the regular attainment of correct discharge paths is facilitated.

4. A ring laser gyroscope comprising:

three lasing cavities formed within a cube and positioned with respect to one another to be sensitive in three othogonal axes, each cavity having four limbs of equal length to form a square and having a mirror positioned at each corner, the mirrors each being placed on a face of the cube and each being shared by two cavities, wherein a single cathode is positioned along an axis extending through two diametrically opposed corners of the cube;

three equal length straight cathode duct means for providing discharge communication between the cathode and the three cavities;

six anodes and six equal length straight anode duct means for providing discharge communication between the anodes and the cavities, the arrangement being such that each cavity includes two cathode ducts leading from the cathode to two adjacent corners of the cavity, two anodes, two anode ducts one for each anode, and has provided two junction points, one in each cathode duct extending from said adjacent corners, wherein each respective anode duct connects with the cavity, each cavity thus having two discharge paths of identical length, each path comprising three components, a cathode duct, an anode duct, and a length of cavity defined between one of said adjacent corners and a junction point, the position of the cathode and the two anodes in relation to one another and to each cavity being such that when an electrostatic field exists between the cathode and each anode, the axes of the three components of each discharge path generally follow the field lines of its associated electrostatic field whereby the attainment of correct discharge paths is facilitated.

5. A multiple-axis ring laser gyroscope comprising:

a plurality of closed polygonal paths defining optical cavities formed in a block of dielectric material;

gas within said cavities for supporting an electric discharge and for then stimulating laser beams to pass around said cavities;

a cathode coupled to said block and communicating with said cavities by way of respective ducts defined within the block and;

at least one anode provided for each cavity which comunicates with its respective cavity at a point spaced from the point at which the cathode communicates with the same cavity, the positions of said cathode and said at least one anode and the directions of said ducts relative to said cavities being such that every angle in the discharge path between the cathode and any anode is a least 90° and, at the instant of application of an electric potential between said cathode and said one anode, the rate of change in electric potential along said path is always on the same polarity.

6. A gyroscope according to claim 1, wherein said at least one part of said initial discharge path comprises a straight duct defined in the dielectric material for connecting each said first electrode to its corresponding lasing cavity.

7. A gyroscope according to claim 6, wherein said at leat one part further comprises a portion of said cavity and at least one further electrode duct.

* * * * *